F. WEHRLE.
SKYLIGHTS.
No. 181,547.  Patented Aug. 29, 1876.
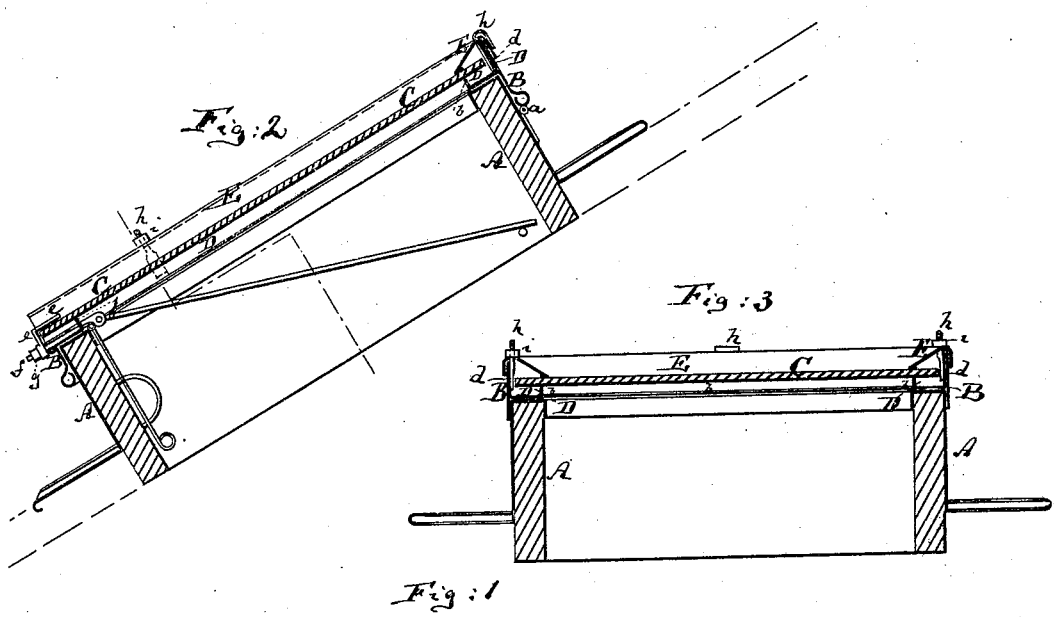
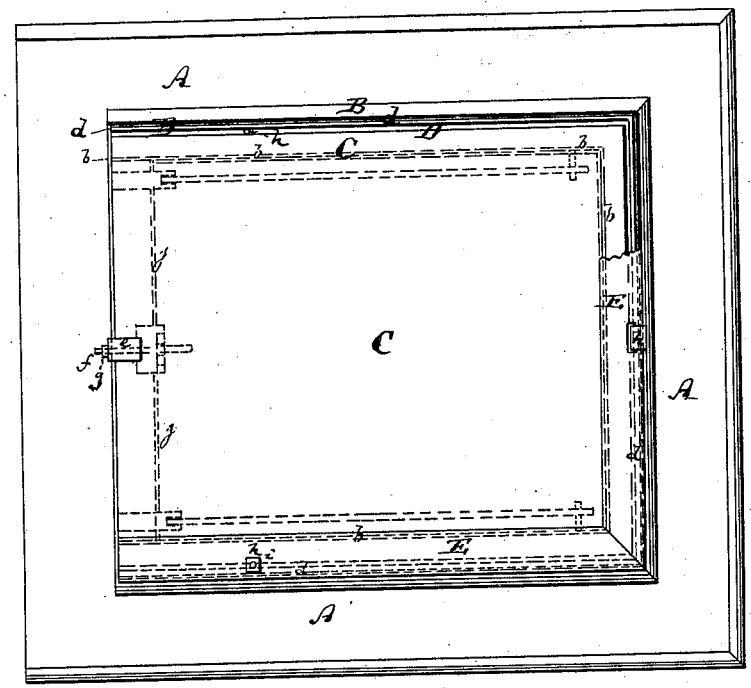
Witnesses  
Otto A. Weidner  
F. v. Briesen
Inventor  
F. Wehrle  
by his attorney  
A. v. Briesen

UNITED STATES PATENT OFFICE.

FLORIAN WEHRLE, OF NEW YORK, N. Y.

IMPROVEMENT IN SKYLIGHTS.

Specification forming part of Letters Patent No. 181,547, dated August 29, 1876; application filed March 9, 1876.

*To all whom it may concern:*

Be it known that I, FLORIAN WEHRLE, of New York city, in the county and State of New York, have invented a new and useful Improvement in Skylights and Attic Windows, of which the following is a specification:

Figure 1 is a plan or top view of a skylight constructed in accordance with my invention. Fig. 2 is a vertical longitudinal section, and Fig. 3 a vertical transverse section of the same.

Similar letters of reference indicate corresponding parts in all the figures.

This invention relates to a new manner of holding in place the glass panes of skylights and attic windows, to prevent the rain-water from passing into the buildings, and dispense with the use of putty.

The invention consists, principally, in the new construction of supporting-trough, and novel manner of clamping the glass, hereinafter more fully described.

The letter A in the drawing represents the main supporting-frame of a skylight or attic window, placed in an inclined position on the roof of a house, as indicated in Fig. 2. B is the frame containing the glass pane C. The frame B is either rigidly secured or hinged at $a$ to the frame A, and is of quadrangular form. On three of its sides the frame B is covered with a trough, D, which is rigidly attached to and constitutes part of the frame B. The trough D consists thus of three sections joined at right angles, and forming the top or upper face of three sides of the frame B. The lower part of said frame B is not covered with the said trough, and the lower ends of the trough are left open, for the convenient discharge of the water. The inner ledge $b$ of the said trough D is less high than the outer ledges $d$ of the same, as is clearly shown in Figs. 2 and 3. The pane of glass C is of a size that when in position it will rest on the inner ledges $b\ b\ b$ of the three sections of trough D, and be flanked on three edges by the outer ledges $d\ d\ d$. The glass is prevented from sliding off the trough D toward the lower side of the frames A B by an L-shaped plate, $e$, which is, with its one arm, fitted upon a pin, $f$, projecting from the frame B, its other arm overlapping the lower edge of the glass, in manner clearly shown in Fig. 2. A nut, $g$, holds the plate $e$ secure on the pin $f$. E is a cap in form of a three-sided inverted trough, placed over the ledges $d\ d$ of the trough D, to cover the same, and to cover also the three edges of the glass that are on the trough D. The inverted trough E is held in place by pins $h\ h$, that project through it from the frame B, and by nuts $i\ i$ thereon, or equivalent fastenings. By the nuts $i\ i$ the trough E can be drawn tight upon the glass to hold the same in position. That side of the frame B which is not covered by the trough D, and which is also the lower side of said frame, has an upwardly-projecting rib, $j$, which reaches to the glass pane, as indicated in Fig. 2, and prevents wind and rain from entering beneath the lower part of the glass.

Rain-water will be free to flow off the lower unobstructed side of the glass, where there is only, if anything, the catch $e$. But any water that may enter beneath the inverted trough E, and reach the upper or the inclined edges of the glass, will be discharged into the gutter D, and flow off the same at the open ends thereof.

I claim as my invention—

1. A skylight-frame B, combined with the trough D, which covers three sides of said frame, and is open at both ends, substantially as herein shown and described.

2. The combination of the trough D, which has the lower inner ledges $b\ b$ and the higher outer ledges $d\ d$, with the glass pane C, that rests on the ledges $b$, between the ledges $d$, substantially as specified.

3. The combination of the cap E with the open-ended trough or gutter D, substantially as specified.

4. The L-shaped clamp $e$, applied to the skylight-frame against the unprotected lower edge of the glass pane, substantially as herein shown and described.

5. The skylight-frame B, provided with the projecting rib $j$, which reaches toward the unprotected lower part of the glass pane C, substantially as herein shown and described.

FLORIAN WEHRLE.

Witnesses:
ERNEST C. WEBB,
OTTO A. WEIDNER.